United States Patent [19]

Lindner et al.

[11] Patent Number: 5,645,151
[45] Date of Patent: Jul. 8, 1997

[54] FLYWHEEL FOR THE FRICTION CLUTCH OF A MOTOR VEHICLE, THE FLYWHEEL HAVING TWO CENTRIFUGAL MASSES AND A FRICTION DEVICE

[75] Inventors: Joachim Lindner, Schweinfurt; Bernhard Schierling, Kürnach, both of Germany

[73] Assignee: Fichtel & Sachs AG, Schweinfurt, Germany

[21] Appl. No.: 515,263

[22] Filed: Aug. 15, 1995

[30] Foreign Application Priority Data

Aug. 17, 1994 [DE] Germany .................. 44 28 832.8

[51] Int. Cl.⁶ .................. F16F 15/139; F16D 13/60
[52] U.S. Cl. .................. 192/70.17; 74/574; 192/214.1
[58] Field of Search ............... 192/70.17, 208, 192/214, 214.1; 74/574; 464/68

[56] References Cited

U.S. PATENT DOCUMENTS

| | | | |
|---|---|---|---|
| 5,030,166 | 7/1991 | Worner et al. | 192/214.1 X |
| 5,139,124 | 8/1992 | Friedmann | 192/214.1 X |
| 5,301,780 | 4/1994 | Jackel | 74/574 X |

FOREIGN PATENT DOCUMENTS

| | | |
|---|---|---|
| 4006639 | 9/1991 | Germany . |
| 2279128 | 12/1994 | United Kingdom . |
| 2279129 | 12/1994 | United Kingdom . |

*Primary Examiner*—Rodney H. Bonck
*Attorney, Agent, or Firm*—Nils H. Ljungman & Associates

[57] ABSTRACT

A flywheel with two centrifugal masses having a hub disc and a cover-like actuator element, on which flywheel both the hub disc and the cover-like actuator element are designed so that the two parts actuate friction devices which act independently of one another. The one friction device is designed to prevent the loss of the screws used for the fastening to the crankshaft.

19 Claims, 1 Drawing Sheet

FIG. 1

FLYWHEEL FOR THE FRICTION CLUTCH OF A MOTOR VEHICLE, THE FLYWHEEL HAVING TWO CENTRIFUGAL MASSES AND A FRICTION DEVICE

BACKGROUND OF THE INVENTION

Field of the Invention

The present invention generally relates to a flywheel arrangement with two centrifugal masses, the flywheel arrangement having a first centrifugal mass fastened to the crankshaft of an internal combustion engine, the first centrifugal mass defining an axis of rotation. There is also a second centrifugal mass, which second centrifugal mass is rotationally mounted on the first centrifugal mass by a bearing. The flywheel arrangement further includes a torsion damping device between the two centrifugal masses, which torsion damping device has several spring elements distributed concentrically with respect to the axis of rotation. In addition, the flywheel arrangement comprises at least one friction device located between the two centrifugal masses. There are also screws on a smaller intermediate diameter parallel to the axis of rotation, which screws connect the first centrifugal mass to the crankshaft.

The flywheel arrangement also has cover-like actuator elements, for the spring elements, with circumferential control edges. The control edges are connected to the second centrifugal mass and are located on both sides of a hub disc with radially-projecting arms. The flywheel arrangement further includes a starter and shifting clutch, which shifting clutch is located on the side of the second centrifugal mass facing away from the first centrifugal mass. The shifting clutch is located on the second centrifugal mass with friction surfaces to clamp a clutch plate.

BACKGROUND INFORMATION

A flywheel arrangement with two centrifugal masses of the generic type described above is disclosed, for example, by German Unexamined Patent Application 40 06 639.

OBJECT OF THE INVENTION

The object of the present invention, on a flywheel arrangement with two centrifugal masses of the generic type described above, is to create a space-saving design which is easy to handle during installation and removal.

SUMMARY OF THE INVENTION

The present invention teaches that this object can be accomplished by a cover-like control or actuator element facing the starter and shifting clutch. The cover-like control element can extend radially inward, and the cover-like control element can be bent at a right angle toward the first centrifugal mass. The cover-like control element can essentially control a friction device, which friction device is preferably oriented concentric to the axis of rotation approximately radially inside the screws, which screws can be used to fasten the first centrifugal mass to the crankshaft. Thus, an additional function can be assigned to the cover-like actuator element, whereby the friction device can be located in a space-saving manner radially inside or inboard of the screws.

The present invention also teaches that the friction device can be located near or located in contact with a sheet metal part, which sheet metal part can preferably be fastened by the screws to the first centrifugal mass. In the area radially inside the diameter formed by the screw heads, the sheet metal part is preferably bent axially toward the clutch essentially in the form of a tube segment. The sheet metal part can form a cylindrical seat on the outside diameter. In the radial space between the screw heads and the tube segment, there can preferably be a friction ring located on a cylindrical seat. The friction ring can be axially and frictionally held in place by a spring, which spring can be supported on the end of the tube segment. In addition, the friction ring can be actuated by areas of the cover-like actuator element. In this manner, the space radially inside the screw heads is preferably used for the location of a friction device.

The present invention also teaches that areas of the cover-like actuator element can be engaged in recesses of the friction ring, whereby the recesses are preferably larger than the areas of the cover-like actuator elements in the circumferential direction. In this manner, it is essentially possible, depending on the particular operating requirements, to design the friction device as a friction device which can operate with some delay or slip. That means that essentially only after a certain rotational angle has been travelled can this friction action become effective. Such an arrangement can be advantageous, in particular, for friction devices which employ a relatively high friction force.

The present invention teaches that the areas which can actuate the friction ring can preferably be formed by fingers which extend approximately radially inward. These fingers can then be engaged in corresponding recesses of the friction ring.

As an additional advantageous feature, the cover-like actuator element can be provided, in the vicinity of the longitudinal axes of the screws, with passage openings for tools, which tools can be used to loosen and tighten the screws. In this manner, access to the screws for installation and removal can be essentially guaranteed.

The present invention also teaches that the cover-like actuator facing the starter and shifting clutch can be extended radially inward, and can be bent at right angles toward the first centrifugal mass. In addition, the hub disc, which hub disc preferably runs essentially radially between the two cover-like actuator elements, can be bent in the vicinity of the outside diameter screw heads of the screws at approximately a right angle with respect to the first centrifugal mass. The hub disc can also form a bend, and can be fastened to the first centrifugal mass. A friction element is preferably located between the bent area of the hub disc and the input-side of the cover-like actuator element. In this manner, a friction device is preferably located in a space-saving manner directly inside the spring elements in the vicinity of the bend of the hub disc.

The present invention also teaches that the friction device can be advantageously designed to generate the basic friction. The friction device can be centered with a friction ring concentric to the axis of rotation, which friction ring can be located in the bend of the hub disc and can be centered there. The friction device can be centered with a spring plate as well, which spring plate can be located between the friction ring and the output-side of the actuator element. As a result of this design configuration, it is essentially possible to generate a sufficient friction force even with low spring forces, since the friction surface can extend conically.

The friction ring can also have an inside diameter, which inside diameter can be smaller than the outside diameter of the heads of the screws. Thus, the inside diameter of the friction ring can be used to essentially prevent the screws from being lost. As a result, the screws can be introduced into their position before the installation of the flywheel with the two centrifugal masses, essentially without losing the screws.

The present invention also teaches that the actuator elements are preferably designed so that they fit tightly, at least radially outward, approximately around the contour of the spring elements. The control edges can preferably be formed by separately installed elements, and the seal can be provided radially inward between the bend of the hub disc and the friction ring. The seal can also be provided between the spring plate and the friction ring, or the output-side of the actuator element. As a result of this configuration, it is essentially possible to fill, at least partly, the interior space in which the spring elements can move with a lubricant, coolant or with a pasty or viscous material, to essentially create an additional damping action.

The hub disc, in the area which is preferably bent toward the screw heads, can advantageously have a bearing point for a bearing, which bearing can support the second centrifugal mass. Thus, the hub disc, in spite of its essentially simple structure, can perform a dual function.

The present invention teaches that the second centrifugal mass can preferably be mounted on the bearing by the cover-like actuator element facing the first centrifugal mass. Thus, the bearing is preferably installed on the hub disc in the immediate vicinity of the first centrifugal mass, which can essentially make it possible to have a very compact construction.

The radially inner area of the actuator element is preferably thereby bent toward the first centrifugal mass. In this area, the actuator element is preferably placed on the bearing, whereby protection can be provided in one axial direction by a collar, and in the other axial direction, by a radially-inward extension of one of the actuator elements forming the control edges.

The two actuator elements can preferably be tightly connected to one another radially outside the spring elements, preferably by welding.

As an additional advantageous feature of the present invention, the hub disc can be bent radially toward the first centrifugal mass inside the arms to actuate the spring elements by a bend in the hub disc. The hub disc can extend radially inward with an additional bend, which additional bend can be in contact with the first centrifugal mass in this area and can be fastened by the screws, together with the first centrifugal mass, on the crankshaft. Radially inside the screw heads, the hub disc can be joined, in one piece, with a tube segment, which tube segment can preferably point away from the first centrifugal mass. As a result of this one-piece component, which is preferably fabricated from sheet metal, it is essentially possible to locate the bearing for mounting the second centrifugal mass in the area between the two bends. It is also essentially possible to locate a friction ring, for the load friction, on the tube segment radially inside the screw heads. The result is an essentially simple, rigid component which can perform several functions.

As an additional feature of the present invention, the cover-like actuator element, in addition to actuating the friction devices, is preferably connected to the second centrifugal mass in an area which extends radially outside the spring elements. The cover-like actuator element can axially surround the second centrifugal mass radially outside the outside diameter of the second centrifugal mass. The cover-like actuator element can be designed, on the side facing away from the first centrifugal mass, for fastening the starter or shifting clutch. In this manner, the cover-like actuator element is preferably designed for the following functions: actuation of the spring elements, actuation of the friction devices, fastening of the second centrifugal mass, and the fastening of the starter or shifting clutch.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch assembly, such as for a transmission for a motor vehicle, the friction clutch assembly comprising: a flywheel, a clutch housing, and a hub, which hub defines an axis of rotation and an axial direction parallel to the axis of rotation; a clutch disc disposed within the clutch housing, the clutch disc coaxially surrounding the hub; a pressure plate disposed within the clutch housing and movable in the axial direction, the pressure plate for applying an axial force to the clutch disc along the axial direction; a biasing apparatus for biasing the pressure plate in the axial direction; the flywheel comprising a first centrifugal mass and a second centrifugal mass; the first centrifugal mass being disposed substantially adjacent the clutch disc axially opposite the pressure plate; the clutch disc being disposed between the pressure plate and the first centrifugal mass; the second centrifugal mass being disposed adjacent the first centrifugal mass axially opposite the clutch disc and the pressure plate; the clutch disc comprising friction linings disposed substantially between the pressure plate and the first centrifugal mass; a hub disc; the hub disc being disposed to coaxially surround the hub; the hub disc being disposed adjacent the second centrifugal mass; elements for connecting the hub disc to the second centrifugal mass; a friction device; the friction device being disposed substantially adjacent the hub; an apparatus for providing frictional engagement with the friction device; the apparatus for providing frictional engagement with the friction device being disposed adjacent the second centrifugal mass; at least a portion of the apparatus for providing frictional engagement with the friction device being disposed substantially adjacent the hub; the at least a portion of the apparatus for providing frictional engagement with the friction device being disposed adjacent and in contact with the friction device; and the friction device being frictionally engaged with the apparatus for providing frictional engagement with the friction device.

Another aspect of the present invention resides broadly in a friction clutch assembly, such as for a transmission for a motor vehicle, the friction clutch assembly comprising: a flywheel; a clutch housing; a hub defining an axis of rotation and an axial direction parallel to the axis of rotation; a clutch disc disposed within the clutch housing, the clutch disc coaxially surrounding the hub; a pressure plate disposed within the clutch housing and movable in the axial direction, the pressure plate for applying an axial force to the clutch disc along the axial direction; a device for biasing the pressure plate in the axial direction; the flywheel comprising a first centrifugal mass and a second centrifugal mass; the first centrifugal mass being disposed substantially adjacent the clutch disc axially opposite the pressure plate; the clutch disc being disposed between the pressure plate and the first centrifugal mass; the second centrifugal mass being disposed adjacent the first centrifugal mass axially opposite the clutch disc and the pressure plate; the clutch disc comprising friction linings; the friction linings being disposed substantially between the pressure plate and the first centrifugal mass; a hub disc; the hub disc being disposed to axially surround the hub; the hub disc being disposed adjacent the second centrifugal mass; devices for connecting the hub disc to the second centrifugal mass; the connecting devices being disposed substantially adjacent the hub; a first friction device; a second friction device; the first friction device being disposed substantially adjacent the hub; the first friction device being disposed at a first radial distance with respect to the hub; the second friction device being disposed at a second radial distance with respect to the hub; the second radial distance being substantially greater than the first radial distance with respect to the hub; an apparatus for providing frictional engagement with the first friction device and the second friction device; the apparatus for providing frictional engagement with the first friction device and the second friction device being disposed substantially axially between the clutch disc and the second centrifugal mass; a first portion of the apparatus for providing frictional engagement with the first friction device and the second friction device being disposed substantially adjacent the hub; the first portion of the apparatus for providing frictional engagement with the first friction device and the second friction device being disposed adjacent and in contact with the first friction device; the first friction device being frictionally engaged with the apparatus for providing frictional engagement with the first friction device and the second friction device; the hub disc having an outer circumference; the hub disc extending in a radial direction with respect to the hub; the hub disc comprising a bent portion; the bent portion extending in an axial direction toward the second centrifugal mass; the bent portion of the hub disc being disposed substantially adjacent the second radial distance with respect to the hub; the second friction device being disposed substantially between the bent portion of the hub disc and the apparatus for providing frictional engagement with the first friction device and the second friction device; and the second friction device being frictionally engaged with the apparatus for providing frictional engagement with the first friction device and the second friction device.

BRIEF DESCRIPTION OF THE DRAWINGS

The present invention is explained below in greater detail with reference to the embodiment illustrated in the accompanying drawing, in which.

DESCRIPTION OF THE PREFERRED EMBODIMENT

Figure 1:
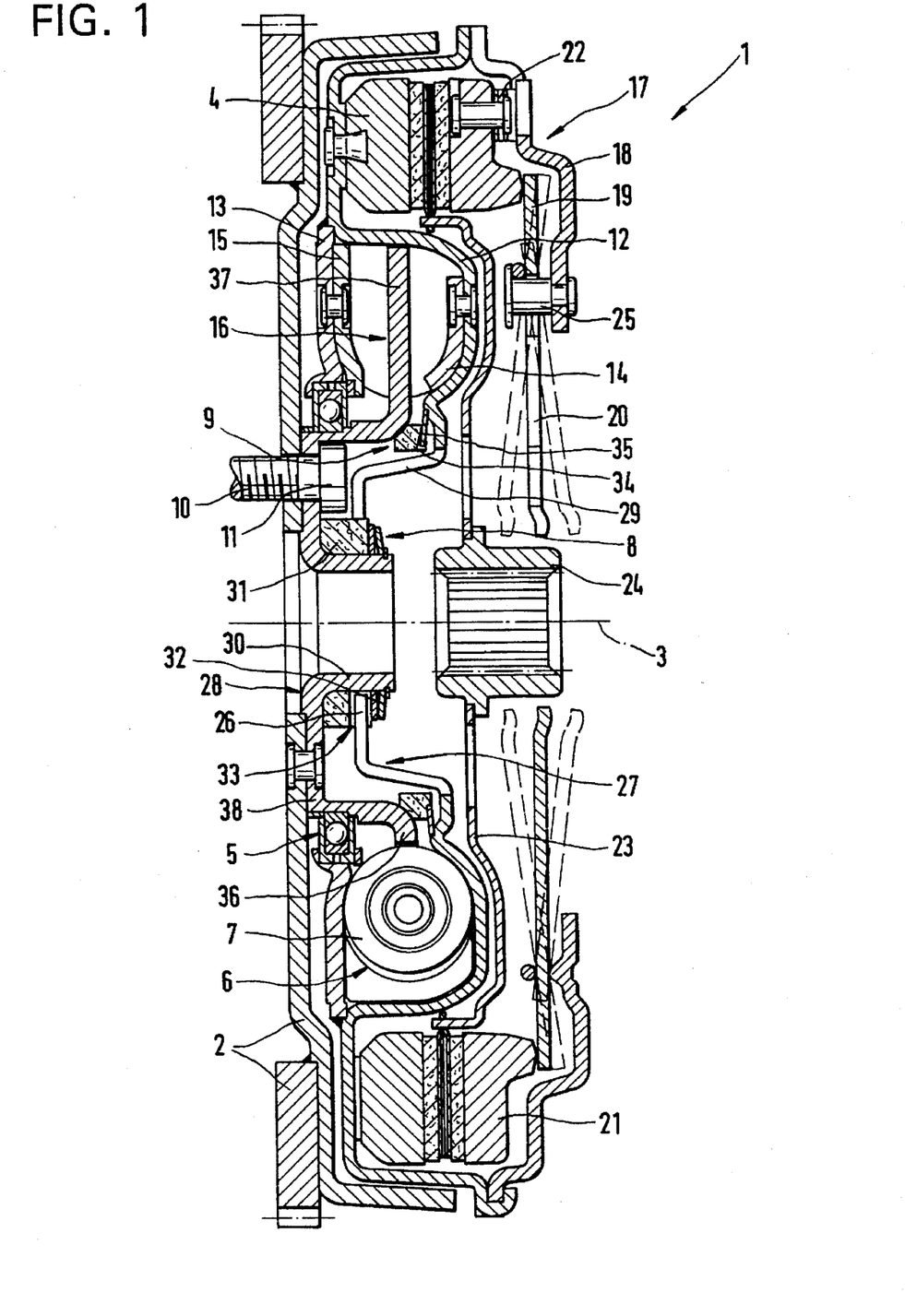
FIG. 1 shows a longitudinal section through a flywheel arrangement with cover-like actuator elements and friction devices.

FIG. 1 shows a longitudinal section through a flywheel 1 with two centrifugal masses 2 and 4. The flywheel 1 preferably has a first centrifugal mass 2 which can be fastened by screws 10 to a crankshaft (as shown in FIG. 1a). In the fastening area, the first centrifugal mass 2 can preferably extend essentially radially and, in particular, perpendicular to the axis of rotation 3. The first centrifugal mass 2 can have, for example in its radially outer area, gear teeth for engagement with the starter gear wheel.

On the side of the screw heads 11 of the screws 10, there can be a torsion damping device 6 and the friction elements of a starter or shifting clutch 17, which torsion damping device 6 and friction elements can be arranged radially on top of one another. The torsion damping device 6 can include several spring elements 7 which can preferably be located on an intermediate diameter concentric to the axis of rotation 3. The spring elements 7 are preferably designed as coil springs. These spring elements 7 can be actuated, on one hand, by structural elements, which structural elements are preferably firmly connected to the second centrifugal mass 4. The spring elements 7 can be actuated, on the other hand, by a central element or hub disc 16, which hub disc 16 can preferably be connected to the first centrifugal mass 2. The central element 16 is preferably designed in the form of a hub disc 16 which can have radially-projecting arms 37 to actuate the spring elements 7.

Radially inside the spring elements 7, the hub disc 16 is preferably bent at a right angle in the axial direction, essentially forming a bend 36 of the hub disc 16. The hub disc 16 then preferably extends to the first centrifugal mass 2, where the hub disc 16 can have a second bend 38. The hub disc 16 can then extend radially inward toward the axis of rotation 3. Radially inside the screw heads 11 of screws 10, the hub disc 16 can preferably form a sheet metal part 28, which sheet metal part 28 can be joined in a single piece with a concentric tube segment 30. The concentric tube segment 30 can point away from the first centrifugal mass 2. Between the two bends 36 and 38 there is a cylindrical area on which a bearing 5 is preferably seated along the inside diameter of the bearing 5.

Therefore, in accordance with an embodiment of the present invention, the spring elements 7 of the torsion damping device 6 can be actuated by the hub disc 16. For this purpose, the hub disc 16 preferably has radially-projecting arms 37 adjacent and in contact with spring elements 7. Toward the radially inner area of the hub disc 16, the hub disc 16 can be designed with bend 36 and bend 38. The bearing 5 can be located on the hub disc 16 preferably in the area between the bend 36 and bend 38. The spring elements 7 of the torsion damping device 6 can also be actuated by cover-like actuator elements 12 and 13.

All of the components which can preferably be connected to the second centrifugal mass 4 and can rotate can be mounted on the outside diameter of the bearing 5. Such components can include the two cover-like actuators 12 and 13, which cover-like actuators 12 and 13 can be located next to the arms 37 of the hub disc 16. The radially outwardly extended area of the cover-like actuator element 12 can support the second centrifugal mass 4. The additional components which are connected to the second centrifugal mass 4 can also include the friction clutch 17 with its circulating or rotating parts. The two cover-like actuator elements 12 and 13 can be connected radially outside the spring 7, where they are preferably welded tight. The cover-like actuator elements 12 and 13 can extend approximately around the contour of the spring elements 7. On the sides facing one another, the cover-like actuator elements 12 and 13 each preferably have respective elements 14 and 15, which elements 14 and 15 preferably comprise control edges for the actuation of the spring elements 7.

In accordance with a preferred embodiment of the present invention, since the hub disc 16 is preferably connected to the first centrifugal mass 2 and the cover-like actuator element 13 is preferably tightly connected with the cover-like actuator element 12, the bearing 5 can essentially permit the cover-like actuator element 13 and the radially-projecting arms 37 of the hub disc 16 to rotate with respect to one another.

As shown in FIG. 1, radially inside the spring elements 7, the output-side of the actuator element 12 can be recessed toward the hub disc 16, where the actuator element 12 can support a spring plate 35. The spring plate 35 can act, by a friction ring 34, on the bend 36 of the hub disc 16. The friction ring 34 can thereby be centered in the vicinity of the bend 36, and the friction ring 34 can represent or act on the hub disc 16 against the generation of a friction force. As shown in FIG. 1, the friction ring 34 and the spring plate 35 are generally designated as friction device 9. The friction ring 34 can thereby be oriented concentric to the axis of rotation 3 and the friction ring 34 can have an inside diameter which is preferably somewhat smaller than the outside diameter of all the screw heads 11 of the screws 10. In this manner, the screws 10 can be installed before the installation of the flywheel arrangement with the two centrifugal masses essentially without any danger of losing the screws.

The actuator element 12 can preferably be extended radially inward beyond the friction ring 34. The actuator element 12 can be bent at a right angle toward the first centrifugal mass 2, and in the vicinity of the screw heads 11, the actuator element 12 can have fingers 26, which fingers 26 can extend radially inward into recesses 33 of a friction ring 31. The friction ring 31 can preferably be friction-fitted onto the outside diameter of the tube segment 30. As shown in FIG. 1, this arrangement is generally designated as the friction device 8. On the end of the tube segment 30 there can be a spring 32, which spring 32 can bias the friction ring 31 on the radially extending portion of the sheet metal part 28. The friction ring 31 can thereby be actuated by the fingers 26, which fingers 26 run radially inward of the extension 27 of the actuator element 12. For this purpose, in the friction ring 31 there are preferably recesses 33, which are preferably circumferentially larger than the fingers 26. A friction with a certain degree of slip can thereby essentially be achieved.

Adjacent to the actuator element 12, pointing away from the first centrifugal mass 2, there can be a clutch plate 23, which clutch plate 23 can be fastened non-rotationally by means of a hub 24 on a transmission shaft (see FIG. 1a). The clutch plate 23, on the radial outside, can support friction linings (see 34' in FIG. 1a), which friction linings can be clamped between the second centrifugal mass 4 and an application plate 21 of the friction clutch 17. The application plate 21 can thereby be non-rotationally located inside a clutch housing 18 by tangential leaf springs 22, for example, which tangential leaf springs 22 can essentially allow the application plate 21 to be displaced axially. The clutch housing 18, in the vicinity of the outside circumference, can be firmly connected to the radially outer area of the actuator element 12. Between the application plate 21 and the clutch housing 18, there can be a membrane spring 19, which membrane spring 19 can be supported on an intermediate diameter of the housing 18 by spacer bolts 25. The membrane spring 19 can be in contact, by its radially outside circumference, with the application plate 21, whereby the membrane spring 19 can apply a load to the application plate 21 toward the second centrifugal mass 4. Toward the radial inside, the membrane spring 19 can be provided with flexible tabs 20 which—similar to the clutch plate 23—can preferably have passage openings corresponding to matching passage openings 29 in the actuator element 12, so that it can be possible to tighten and loosen the screws 10 using a tool.

It should be understood that in at least one embodiment of the present invention, the friction clutch as shown in FIG. 1 may be considered to be shown to scale.

As a result of the design of the actuator element 12 described and illustrated above, the actuator element 12 can essentially be used for many different functions. Radially outside the springs 7, the actuator element 12 can preferably run parallel to the first centrifugal mass 2 toward the radial outside, and in this area, the actuator element 12 can preferably support the second centrifugal mass 4. The second centrifugal mass 4 can be located separately as a ring concentric to the axis of rotation 3. Then the actuator element 12 preferably surrounds the second centrifugal mass 4 and the clutch plate 23 in a basin-shaped fashion, pointing away from the first centrifugal mass 2. The actuator element 12 also preferably has facilities in the terminal area for fastening the clutch housing 18 of the friction clutch 17.

In accordance with an embodiment of the present invention, the actuator elements 12 and 13 are preferably contoured to essentially surround the spring elements 7. Specifically, the actuator element 13 preferably extends in the radial direction essentially adjacent the first centrifugal mass 2, whereas the actuator element 12 preferably forms a contoured shape essentially enclosing a large portion of the circumference of the spring elements 7. Radially closely outside the spring elements 7, the actuator element 12 can extend in the axial direction toward the first centrifugal mass 2. In this area, the actuator elements 12 and 13 are preferably joined together and tightly connected with one another, preferably by welding. Radially outside the connection of actuator elements 12 and 13, the actuator element 12 preferably extends radially outward and essentially between the first centrifugal mass 2 and the second centrifugal mass 4. In this area, the actuator element 12 is preferably located adjacent and fastened together with the second centrifugal mass 4. In this manner, the actuator element 12 can support the second centrifugal mass 4. Radially inside the spring elements 7, the actuator element 12 is preferably contoured into a curve in a direction toward and adjacent the hub disc 16. Radially further inside the spring elements 7, the actuator element 12 preferably bends at an essentially right angle toward the first centrifugal mass 2. The actuator element 12 then preferably extends in an essentially axial direction toward the first centrifugal mass 2. In the area closely radially outside the friction device 8, the actuator element 12 can preferably bend radially inward toward the friction device 8. The actuator element 12 preferably extends radially inward whereby the fingers 26 of the actuator element 12 can be in contact with the friction device 8.

Radially inside the springs 7, the actuator element 12 can be recessed inward and can support a spring plate 35 for a friction ring 34, which friction ring 34 can preferably be adjacent to the bend 36 of the hub disc 16 and here preferably generates the basic friction. Radially inside the friction ring 34, the actuator element 12 can be bent at a right angle toward the screws 10, and a short distance in front of the screw heads 11, the actuator element 12 can swing radially inward with fingers 26, which fingers 26 can actuate the friction ring 31. In this radially inner area, the actuator element 12 is preferably provided with passage openings 2 which essentially make it possible to introduce tools to tighten and loosen the screws 10. The hub disc 16, as a result of its shape, can also essentially perform multiple functions, and preferably supports, on one hand, in a cylindrical area between the two bends 36 and 38, the bearing 5 for essentially all the parts of the second centrifugal mass 4. On the other hand, the hub disc 16 is preferably designed, in its radially inner area, radially inside the screws 10, as a one-piece tube segment 30 which preferably supports the friction device 8. Both the actuator elements 12 and 13 are preferably connected tightly to one another radially outside the springs 7—e.g. by a weld—so that the interior space can be filled, at least partly, with a lubricant, coolant or with a pasty or viscous material, to create an additional damping device. Radially inward, this space is sealed, on one hand, by providing the bearing 5 with at least one seal, and, on the other hand, by essentially having the friction device 9 also perform a sealing action.

Summarizing, in accordance with an embodiment of the present invention, in the area radially outside the springs 7, the actuator elements 12 and 13 can preferably be connected, for example, by a weld. In the area radially outside the screws 10, there can preferably be a seal adjacent the bearing 5. The seal for the bearing 5 can be provided by the actuator element 13. The radially inner end of the actuator element 13 can abut the bearing 5. The radially inner end of the actuator element 13 can then extend in essentially the axial direction and then curve radially inward thereby essentially surrounding one edge of the bearing 5. On the other hand, the control edge 15 of the actuator element 13 can extend radially inward whereby the radially inner end of the control edge 15 can abut the other edge of the bearing 5. Another seal can also preferably be provided by means of the friction device 9. As a result of such seals along with the connection between the actuator elements 12 and 13, the interior space between the actuator elements 12 and 13 can be sealed and can thereby be filled, at least partially, with a damping medium such as a lubricant or coolant or viscous material.

One feature of the invention resides broadly in the flywheel with two centrifugal masses, comprising a first centrifugal mass fastened to the crankshaft of an internal combustion engine and defining an axis of rotation, a second centrifugal mass which is rotationally mounted on the first centrifugal mass by means of a bearing, a torsion damping device between the two centrifugal masses with several spring elements distributed concentrically to the axis of rotation, at least one friction device between the two centrifugal masses, screws on a smaller intermediate diameter parallel to the axis of rotation which connect the first centrifugal mass to the crankshaft, cover-like actuator elements for the spring elements with circumferential control edges which are connected to the second centrifugal mass and which are located on both sides of a hub disc with radially-projecting arms, a starter clutch or clutch on the side of the second centrifugal mass facing away from the first centrifugal mass, which clutch is located on the second centrifugal mass with friction surfaces to clamp or fix a clutch plate, characterized by the fact that the cover-like actuator element 12 facing the starter and shifting clutch 17 is extended radially inward and is bent at a right angle toward the first centrifugal mass 2 and actuates a friction device 8 which is oriented concentric to the axis of rotation 3 approximately radially inside the screws 10 to fasten the first centrifugal mass 2 to the crankshaft.

Another feature of the invention resides broadly in the flywheel with two centrifugal masses characterized by the fact that the friction device 8 is located by a sheet metal part 28 which is fastened by means of the screws 10 to the first centrifugal mass, and radially inside the diameter formed by the screw heads 11, is bent toward the clutch 17 in the form of a tube segment 30, and forms a cylindrical seat on the outside diameter.

Yet another feature of the invention resides broadly in the flywheel with two centrifugal masses characterized by the fact that in the radial space between the screw heads 11 and the tube segment 30, there is a friction ring 31 located on the cylindrical seat, which is axially friction-seated in place by a spring 32 which is supported on the end of the tube segment 30, and which is actuated by areas 26 of the cover-like actuator element 12.

Still another feature of the invention resides broadly in the flywheel with two centrifugal masses characterized by the fact that the areas 26 are engaged in recesses 33 of the friction ring 31, whereby the recesses 33 are preferably larger in the circumferential direction than the areas 26.

A further feature of the invention resides broadly in the flywheel with two centrifugal masses characterized by the fact that the areas which actuate the friction ring 31 are formed by fingers 26 which run approximately radially inward.

Another feature of the invention resides broadly in the flywheel with two centrifugal masses characterized by the fact that the cover-like actuator element 12 has passage openings 29 for tools used to tighten and loosen the screws 10 in the vicinity of the longitudinal axes of the screws 10.

Yet another feature of the invention resides broadly in the flywheel with two centrifugal masses, comprising a first centrifugal mass fastened to the crankshaft of an internal combustion engine and defining an axis of rotation, a second centrifugal mass which is rotationally mounted on the first centrifugal mass by means of a bearing, a torsion damping device between the two centrifugal masses with several spring elements distributed on the circumference on an intermediate diameter concentric to the axis of rotation, at least one friction device between the two centrifugal masses, screws on a smaller intermediate diameter parallel to the axis of rotation which connect the first centrifugal mass to the crankshaft, cover-like actuator elements for the spring elements with circumferential control edges which are connected to the second centrifugal mass and which are located on both sides of a hub disc with radially-projecting arms, a starter and shifting clutch on the side of the second centrifugal mass facing away from the first centrifugal mass, which clutch is located on the second centrifugal mass with friction surfaces to clamp a clutch plate, characterized by the fact that the cover-like actuator element 12 facing the starter and shifting clutch 17 is extended radially inward and is bent at a right angle toward the first centrifugal mass 2 and actuates a friction device 8, that the hub disc 16 which runs essentially radially, in the vicinity of the outside diameter of the screw heads 11 of the screws 10 is bent at approximately a right angle to the first centrifugal mass 2 and forms a bend 36 and is fastened to the first centrifugal mass 2, and a friction device 9 is located between the bent area and the output-side, cover-like actuator element 12.

Still another feature of the invention resides broadly in the flywheel with two centrifugal masses characterized by the fact that the friction device 9 is designed to generate the basic friction, with a friction ring 34 which is concentric to the axis of rotation 3, which is adjacent to the bend 36 and is centered there, as well as a spring plate 35 between the friction ring 34 and the output-side actuator element 12.

A further feature of the invention resides broadly in the flywheel with two centrifugal masses characterized by the fact that the friction ring 34 has an inside diameter which is smaller than the outside diameter of the heads 11 of the screws 10 and thus prevents the screws 10 from being lost.

Another feature of the invention resides broadly in the flywheel with two centrifugal masses characterized by the fact that the actuator elements 12, 13 are designed so that they fit tightly around the contour of the spring elements 7, at least radially outward, and the control edges are formed by separately installed elements 14, 15, and the seal is provided radially inwardly between the bend 36 and the friction ring 34, as well as between the spring plate 35 and the friction ring 34 or the output-side actuator element 12, respectively.

Yet another feature of the invention resides broadly in the flywheel with two centrifugal masses characterized by the fact that the hub disc 16 has a bearing point in the area which is bent toward the screw heads 11 for a bearing 5 which supports the second centrifugal mass 4.

Still another feature of the invention resides broadly in the flywheel with two centrifugal masses characterized by the fact that the second centrifugal mass 4 is mounted on the bearing 5 by means of the cover-like actuator element 13 facing the first centrifugal mass 2.

A further feature of the invention resides broadly in the flywheel with two centrifugal masses characterized by the fact that the radially inner area of the actuator element 13 is bent toward the first centrifugal mass 2, in this area is placed on the bearing 5, axial protection is provided in one direction by a collar, and the axial protection is provided in the other direction by an extension of one of the elements forming the control edges 15.

Another feature of the invention resides broadly in the flywheel with two centrifugal masses characterized by the fact that the bearing 5 is designed as a roller bearing, with at least one seal on the side facing the first centrifugal mass 2.

Yet another feature of the invention resides broadly in the flywheel with two centrifugal masses characterized by the fact that the two actuator elements 12, 13 are connected tightly to one another, preferably by welding, radially outside the spring elements 7.

Still another feature of the invention resides broadly in the flywheel with two centrifugal masses characterized by the fact that the hub disc 16 is bent toward the first centrifugal mass 2 radially inside the arms 37 for the actuation of the spring elements 7 by means of a bend 36, the hub disc runs radially inward with an additional bend 38, in this area is adjacent to the first centrifugal mass 2, and is fastened by the screws 10 together with the first centrifugal mass 2 to the crankshaft, and radially inside the screw heads 11 is joined in one piece with a tube segment 30 which points away from the first centrifugal mass 2.

A further feature of the invention resides broadly in the flywheel with two centrifugal masses characterized by the fact that the bearing for mounting the second centrifugal mass 4 is located in the area between the two bends 36, 38, and a friction ring 31 for the friction device 8 for the load friction is located on the tube segment 30 radially inside the screw heads 11.

Another feature of the invention resides broadly in the flywheel with two centrifugal masses characterized by the fact that the cover-like actuator element 12, in addition to the actuation of the friction device 8, 9 is connected radially outside the spring elements 7, in an area which runs radially, to the second centrifugal mass 4, surrounds the second centrifugal mass 4 radially outside its outside diameter, and is designed on the side away from the first centrifugal mass 2 for fastening the starter/shifter clutch 7.

The components disclosed in the various publications, disclosed or incorporated by reference herein, may be used in the embodiments of the present invention, as well as, equivalents thereof.

Some examples of clutch assemblies and various components associated therewith which could possibly utilize the present invention may be disclosed in the following U.S. patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Additional examples of clutch assemblies and various components associated therewith which could utilize the present invention may be disclosed in the following U.S. patents: U.S. Pat. No. 5,117,959 entitled "Torsion Damping Device in Particular for Automotive Vehicles" to Valeo; U.S. Pat. No. 4,763,767 entitled "Torsional Damping Device" to Valeo; U.S. Pat. No. 4,667,801 entitled "Clutch Disc Arrangement" to Fichtel & Sachs; U.S. Pat. No. 5,238,096 entitled "Clutch Plate for a Motor Vehicle Friction CLutch" to Fichtel & Sachs; and U.S. Pat. No. 5,016,744 entitled "Clutch Disc for a Friction Clutch" to Fichtel & Sachs.

Some examples of transmissions in which the present invention may be incorporated may be disclosed by the following U.S. patents: U.S. Pat. No. 5,199,316 to Hoffman, entitled "Fully-Synchronized Multiple Speed Manual Transmission for Motor Vehicle"; U.S. Pat. No. 4,458,551 to Winter, entitled "Manual Transmission"; and U.S. Pat. No. 3,858,460 to Porter et al., entitled "Four Speed Manual Transmission and Control".

Some types of neoprene plastics that could be utilized in accordance with the present invention may be or are disclosed in the following U.S. patents: U.S. Pat. No. 5,217,778 entitled "Composite Fiber Friction Facing" to Raymark Industries; U.S. Pat. No. 5,360,842 entitled "Non-asbestos Friction Material" to Akebono; and U.S. Pat. No. 5,281,651 entitled "Compatibilization of Dissimilar Elastomer Blends Using Ethylene/Acrylate/Acrylic Acid Terpolymers" to Arjunan and Kusznir.

Some examples of two-mass flywheels and the components thereof which may incorporate the present invention therein may be disclosed by the following U.S. patents: U.S. Pat. No. 5,103,688 to Kuhne, entitled "Two-Mass Flywheel"; U.S. Pat. No. 4,777,843 to Bopp, entitled "Two-Mass Flywheel Assembly With Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. P 44 28 832.8, filed on Aug. 17, 1994, having inventors Joachim Lindner and Bernhard Schierling, and DE-OS P 44 28 832.8 and DE-PS P 44 28 832.8, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly such as for a transmission for a motor vehicle, said friction clutch assembly comprising:

a flywheel;

a clutch housing;

a hub;

said hub defining an axis of rotation and an axial direction parallel to said axis of rotation;

a clutch disc disposed within said clutch housing, said clutch disc coaxially surrounding said hub;

pressure plate means disposed within said clutch housing and being movable in said axial direction, said pressure plate means for applying an axial force to said clutch disc along the axial direction;

biasing means for biasing said pressure plate means in the axial direction;

said flywheel comprising a first centrifugal mass and a second centrifugal mass;

said first centrifugal mass being disposed substantially adjacent said clutch disc axially opposite said pressure plate means;

said clutch disc being disposed between said pressure plate means and said first centrifugal mass;

said second centrifugal mass being disposed adjacent said first centrifugal mass axially opposite said clutch disc and said pressure plate means;

said clutch disc comprising at least one friction lining;

said at least one friction lining being disposed substantially between said pressure plate means and said first centrifugal mass;

a hub disc;

said hub disc being disposed adjacent said second centrifugal mass;

said hub disc having a central portion disposed substantially adjacent said axis of rotation;

means for connecting said hub disc to said second centrifugal mass;

a friction device;

said friction device being disposed substantially adjacent said central portion;

means for providing frictional engagement with said friction device;

said means for providing frictional engagement with said friction device being disposed adjacent said second centrifugal mass;

at least a portion of said means for providing frictional engagement with said friction device being disposed substantially adjacent said central portion;

said at least a portion of said means for providing frictional engagement with said friction device being disposed adjacent and in contact with said friction device;

said friction device being frictionally engaged with said means for providing frictional engagement with said friction device;

said means for connecting said hub disc to said second centrifugal mass comprising a plurality of fastening means;

said plurality of fastening means being disposed to surround said central portion;

said plurality of fastening means being disposed at a first radial distance with respect to said central portion; and said friction device being disposed radially within said first radial distance with respect to said central portion.

2. The friction clutch assembly according to claim 1, wherein:

said means for providing frictional engagement with said friction device being connected to a substantially continuous element;

said substantially continuous element being disposed substantially between said clutch disc and said second centrifugal mass;

said substantially continuous element extending outwardly toward and being connected with said first centrifugal mass;

said substantially continuous element extending from said first centrifugal mass toward said central portion;

said substantially continuous element rotating with said first centrifugal mass;

said substantially continuous element having a dimension extending from said first centrifugal mass substantially to said central portion;

said substantially continuous element having a thickness; and said dimension of said substantially continuous element being substantially greater than said thickness thereof.

3. The friction clutch assembly according to claim 2, wherein:

said substantially continuous element comprises a portion disposed substantially axially between said plurality of fastening means and said clutch disc; and said portion of said substantially continuous element extending at a substantially right angle toward said second centrifugal mass.

4. The friction clutch assembly according to claim 3, wherein:

said substantially continuous element comprises a cover-like element; and said cover-like element extends substantially radially with respect to said axis of rotation.

5. The friction clutch assembly according to claim 4, wherein:

said hub disc comprises a first portion;

said first portion of said hub disc comprising a sheet metal material;

said first portion of said hub disc comprises an extension;

said extension of said hub disc extending in a radial direction with respect to said axis of rotation;

said extension of said hub disc being disposed adjacent and connected to said second centrifugal mass by said plurality of fastening means;

said first portion of said hub disc further comprising said central portion;

said central portion of said hub disc extending in said axial direction with respect to said hub;

a portion of said central portion of said hub disc being disposed substantially adjacent said hub;

said central portion of said hub disc extending axially away from said second centrifugal mass;

said first portion of said hub disc further comprising a bent portion;

said bent portion of said hub disc being disposed substantially between said extension and said central portion of said hub disc;

said central portion of said hub disc comprising a tubular member;

said tubular member having an inner diameter;

said tubular member having an outer diameter;

said outer diameter of said tubular member being disposed at a greater radial distance from said axis of rotation than said inner diameter;

said friction device being disposed substantially between said first radial distance of said plurality of fastening means and said outer diameter of said tubular member; and said friction device being disposed adjacent and in contact with said outer diameter of said tubular member of said hub disc.

6. The friction clutch assembly according to claim 5, wherein:

said friction device comprises a friction ring;

said tubular member of said hub disc having a first end and a second end;

said first end of said tubular member of said hub disc being disposed adjacent said bent portion of said hub disc;

said second end of said tubular member of said hub disc being disposed opposite said first end and facing away from said second centrifugal mass;

means for axially fixing said friction ring;

said means for axially fixing said friction ring being disposed at said second end of said tubular member of said hub disc;

said means for providing frictional engagement with said friction device comprising projecting portions;

said projecting portions extending substantially adjacent said friction ring; and said friction ring being frictionally engaged with said projecting portions.

7. The friction clutch assembly according to claim 6, wherein:

said friction ring comprises recessed portions;

said recessed portions of said friction ring having a circumferential dimension;

said projecting portions of said means for providing frictional engagement with said friction device having a circumferential dimension;

said circumferential dimension of said recessed portions being substantially greater than said circumferential dimension of said projecting portions; and said projecting portions extending radially inwardly with respect to said axis of rotation.

8. A friction clutch assembly such as for a transmission for a motor vehicle, said friction clutch assembly comprising:

a flywheel;

a clutch housing;

a hub;

said hub defining an axis of rotation and an axial direction parallel to said axis of rotation;

a clutch disc disposed within said clutch housing, said clutch disc coaxially surrounding said hub;

pressure plate means disposed within said clutch housing and being movable in said axial direction, said pressure plate means for applying an axial force to said clutch disc along the axial direction;

biasing means for biasing said pressure plate means in the axial direction;

said flywheel comprising a first centrifugal mass and a second centrifugal mass;

said first centrifugal mass being disposed substantially adjacent said clutch disc axially opposite said pressure plate means;

said clutch disc being disposed between said pressure plate means and said first centrifugal mass;

said second centrifugal mass being disposed adjacent said first centrifugal mass axially opposite said clutch disc and said pressure plate means;

said clutch disc comprising at least one friction lining;

said at least one friction lining being disposed substantially between said pressure plate means and said first centrifugal mass;

a hub disc;

said hub disc being disposed adjacent said second centrifugal mass;

said hub disc having a central portion disposed substantially adjacent said axis of rotation;

means for connecting said hub disc to said second centrifugal mass;

a friction device;

said friction device being disposed substantially adjacent said central portion;

means for providing frictional engagement with said friction device;

said means for providing frictional engagement with said friction device being disposed adjacent said second centrifugal mass;

at least a portion of said means for providing frictional engagement with said friction device being disposed substantially adjacent said central portion;

said at least a portion of said means for providing frictional engagement with said friction device being disposed adjacent and in contact with said friction device;

said friction device being frictionally engaged with said means for providing frictional engagement with said friction device;

means for torsionally damping said friction clutch assembly;

said means for torsionally damping comprising a plurality of spring means;

said plurality of spring means being disposed substantially adjacent said hub disc;

said means for providing frictional engagement with said friction device further providing frictional engagement with said plurality of spring means;

said plurality of spring means being frictionally engaged with said means for providing frictional engagement with said friction device;

said friction clutch assembly further comprising means for rotatably connecting said hub disc and said means for providing frictional engagement with said friction device;

said means for rotatably connecting comprising a bearing;

said means for connecting said hub disc to said second centrifugal mass comprising a plurality of screws;

said means for providing frictional engagement with said friction device comprising a plurality of passages;

said means for providing frictional engagement with said friction device comprising portions being disposed substantially adjacent said plurality of screws;

said portions of said means for providing frictional engagement with said friction device comprising said plurality of passages;

said plurality of passages being disposed axially with respect to said plurality of screws; and said plurality of passages comprising means for providing an adjustment of said screws.

9. A flywheel with two centrifugal masses for a friction clutch assembly for a transmission for a motor vehicle, said flywheel comprising:

a first centrifugal mass and a second centrifugal mass;

said first centrifugal mass having a first side and a second side disposed axially opposite one another;

said first side of said first centrifugal mass for being disposed substantially adjacent a clutch disc;

said second centrifugal mass being disposed adjacent said second side of said first centrifugal mass;

a hub disc;

a central portion disposed substantially adjacent said axis of rotation;

means for connecting said hub disc to said second centrifugal mass;

said connecting means being disposed substantially adjacent said central portion;

a first friction device;

a second friction device;

said first friction device being disposed substantially adjacent said central portion;

means for providing frictional engagement with said first friction device and said second friction device;

said means for providing frictional engagement being disposed substantially adjacent said hub disc;

a first portion of said means for providing frictional engagement being disposed substantially adjacent said central portion;

said first portion of said means for providing frictional engagement being disposed adjacent and in contact with said first friction device;

said first friction device being frictionally engaged with said means for providing frictional engagement;

said hub disc having an outer circumference;

said hub disc having a portion extending in a radial direction with respect to the axis of rotation;

said hub disc comprising a bent portion;

said bent portion extending in an axial direction toward said second centrifugal mass;

said second friction device being disposed substantially between said bent portion of said hub disc and said second portion of said means for providing frictional engagement; and said second friction device being frictionally engaged with said means for providing frictional engagement.

10. The flywheel according to claim 9, wherein:

said means for connecting said hub disc to said second centrifugal mass comprises a plurality of screws;

said plurality of screws comprise head portions;

each of said head portions have an outside diameter; and said bent portion of said hub disc is disposed adjacent said outside diameter of said head portions.

11. The flywheel according to claim 10, wherein:

said flywheel further comprises a substantially continuous element;

said substantially continuous element being disposed adjacent said hub disc;

said substantially continuous element comprises a first part connected to said first centrifugal mass;

said substantially continuous element further comprises a second part, said second part being disposed radially inwardly from said first part and comprises said means for providing frictional engagement;

said second part having a bent portion extending axially towards said second centrifugal mass.

12. The flywheel according to claim 11, wherein:

said second friction device is configured to generate the basic friction;

said second friction device comprises a friction ring;

said friction ring being disposed concentrically about said axis of rotation;

said friction ring being disposed adjacent said bent portion of said hub disc;

said second friction device comprises means for axially prestressing said friction ring; and said means for axially prestressing being disposed between said friction ring and said means for providing frictional engagement.

13. The flywheel according to claim 12 wherein said means for axially prestressing comprises a spring plate.

14. The flywheel according to claim 12 wherein:

said first friction device has an outside diameter with respect to said axis of rotation;

said second friction device has an inside diameter with respect to said axis of rotation;

said inside diameter of said second friction device being substantially greater than said outside diameter of said first friction device; and the difference between said inside diameter of said of said second friction device and the outside diameter of said first friction device being of a sufficient dimension to substantially maintain in place said plurality of screws.

15. The flywheel according to claim 14 wherein:

said flywheel further comprises means for torsionally damping a clutch assembly;

said means for torsionally damping comprises a plurality of spring means;

said substantially continuous element comprises a third part disposed between said first part and said second part;

said third part being disposed to fit substantially tightly about ones of said plurality of spring means;

said third part having an interior surface and an exterior surface;

said interior surface facing toward said plurality of spring means;

said interior surface comprises a contour substantially matching a contour of ones of said plurality of spring means;

said third part comprises means for actuating said plurality of spring means;

said actuation means comprises two separate members disposed on said interior surface;

said substantially continuous element defines a chamber area;

said substantially continuous element comprises means for sealing said chamber area;

said means for sealing being disposed between said friction ring and said bent portion of said hub disc;

said means for sealing being disposed between said spring plate and at least one of:
said friction ring; and
said third part.

16. The flywheel according to claim 15 wherein:

said hub disc comprises a first portion extending in a radial direction from said bent portion of said hub disc;

said first portion of said hub disc being disposed adjacent and connected to said second centrifugal mass by said plurality of screws;

said hub disc further comprises said central portion;

said central portion of said hub disc extending from said first portion in an axial direction away from said second centrifugal mass;

said flywheel further comprises a bearing for providing support to said first centrifugal mass; and said bearing being disposed on said hub disc substantially adjacent said bent portion of said hub disc.

17. The flywheel according to claim 16 wherein:

said third part comprises a cover-element extending between said first part and said bearing, one of said two separate members being fastened to said cover-element;

said third part and said cover-element defining a substantial part of said chamber area;

said cover-element comprises a bent part extending axially toward said second centrifugal mass; and said bent part comprises means for mounting said first centrifugal mass on said bearing.

18. The flywheel according to claim 17 wherein:

said two separate members of said actuation means comprise a first member and a second member;

said first member being fastened to said cover-element;

said first member comprising an end portion being in contact with said bearing;

said end portion comprising means for providing axial support to said bearing on one side of said bearing;

said bent part of said cover-element comprises a collar for providing axial support to an opposite side of said bearing;

said bearing comprises a roller bearing;

said bearing comprises at least one seal disposed adjacent said second centrifugal mass;

said cover-element being welded to said first part; and said welding being disposed radially outward of said plurality of spring means.

19. The flywheel according to claim 18, wherein:

said radially extending portion of said hub disc comprises means for actuating said plurality of spring means;

said central portion of said hub disc comprises a tubular member;

said tubular member being disposed radially inside said plurality of screws;

said bent portion of said hub disc has a bend in contact with said second friction device;

said first portion of said hub disc has a bend immediately adjacent said second centrifugal mass;

said bearing being disposed between said bend in contact with said second friction device and said bend immediately adjacent said second centrifugal mass;

said tubular member having an inner surface and an outer surface;

said first friction device comprises a friction ring;

said friction ring being disposed concentrically about said axis of rotation;

said first friction device being disposed on said outer surface of said tubular member and radially inside said head portions of said plurality of screws;

said first friction device being configured to generate the load friction;

said substantially continuous element comprises a fourth part disposed radially outside said first centrifugal mass;

said fourth part extending in an axial direction from said first part away from said second centrifugal mass; and said fourth part comprises means for fastening said continuous element to the clutch housing.

* * * * *

UNITED STATES PATENT AND TRADEMARK OFFICE
CERTIFICATE OF CORRECTION

Page 1 of 2

PATENT NO. : 5,645,151
DATED : July 8, 1997
INVENTOR(S) : Joachim LINDNER and Bernhard SCHIERLING It is certified that error appears in the above-identified patent and that said Letters Patent is hereby corrected as shown below:

In column 5, line 7, after 'disposed to', delete "axially" and insert --coaxially--.

In column 8, line 57, after 'openings', delete "2" and insert --29--.

In column 13, line 2, Claim 1, after 'assembly' delete "such as".

In column 15, line 49, Claim 8, after 'assembly' delete "such as".

In column 18, line 24, Claim 14, after 'claim', delete "12" and insert --13--.

In column 5, line 60, after 'crankshaft', delete "(as shown in FIG. 1a)." and insert --.--.

UNITED STATES PATENT AND TRADEMARK OFFICE
CERTIFICATE OF CORRECTION

PATENT NO. : 5,645,151
DATED : July 8, 1997
INVENTOR(S) : Joachim LINDNER and Bernhard SCHIERLING It is certified that error appears in the above-identified patent and that said Letters Patent is hereby corrected as shown below:

In column 7, line 40, after 'shaft', delete "(see FIG. 1a)." and insert --.--.

In column 7, line 42, after the first occurrence of 'linings', delete "(see 34' in FIG. 1a)," and insert --,--.

Signed and Sealed this

Fourteenth Day of July, 1998

Attest:

Attesting Officer

BRUCE LEHMAN

Commissioner of Patents and Trademarks